E. DE V. TOMPKINS.
SAWING APPARATUS.
APPLICATION FILED MAY 1, 1914.
1,215,431.
Patented Feb. 13, 1917.
3 SHEETS—SHEET 1.
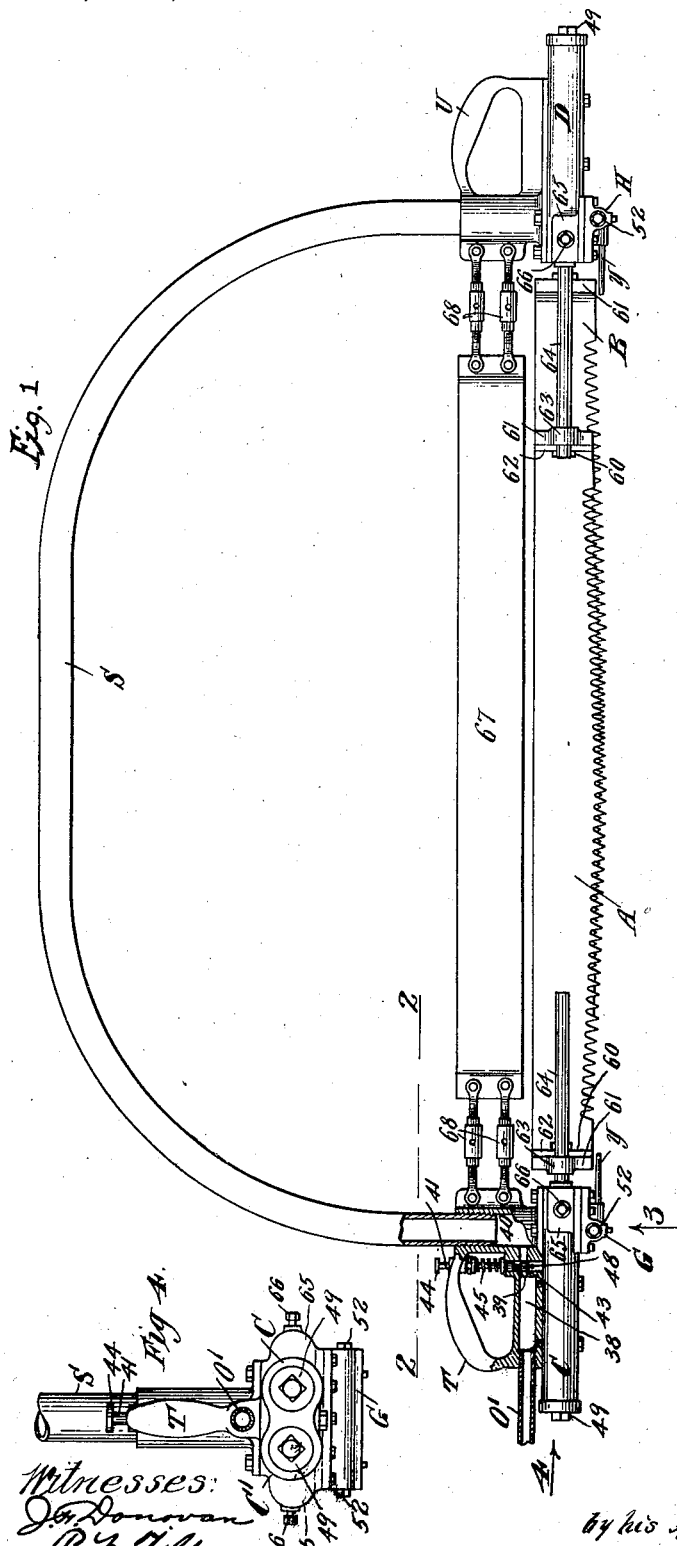
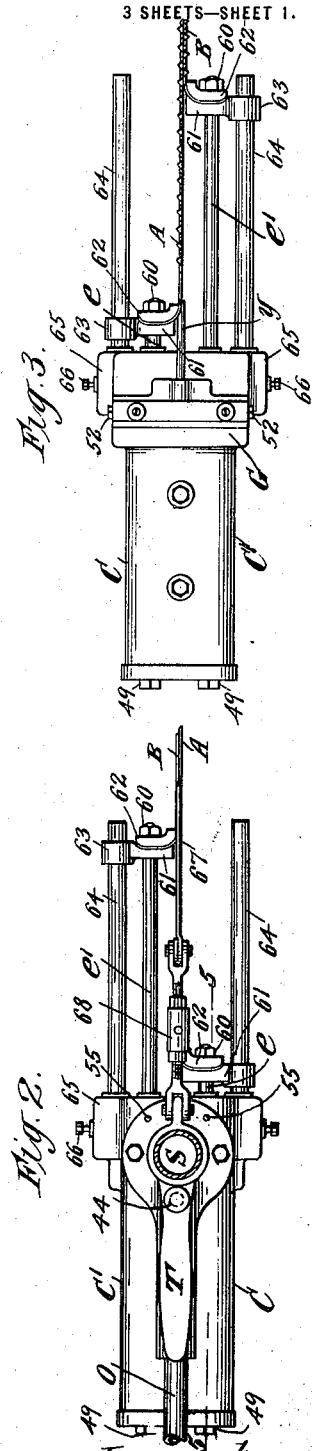
Inventor:
Edward De Voe Tompkins
by his Attys:

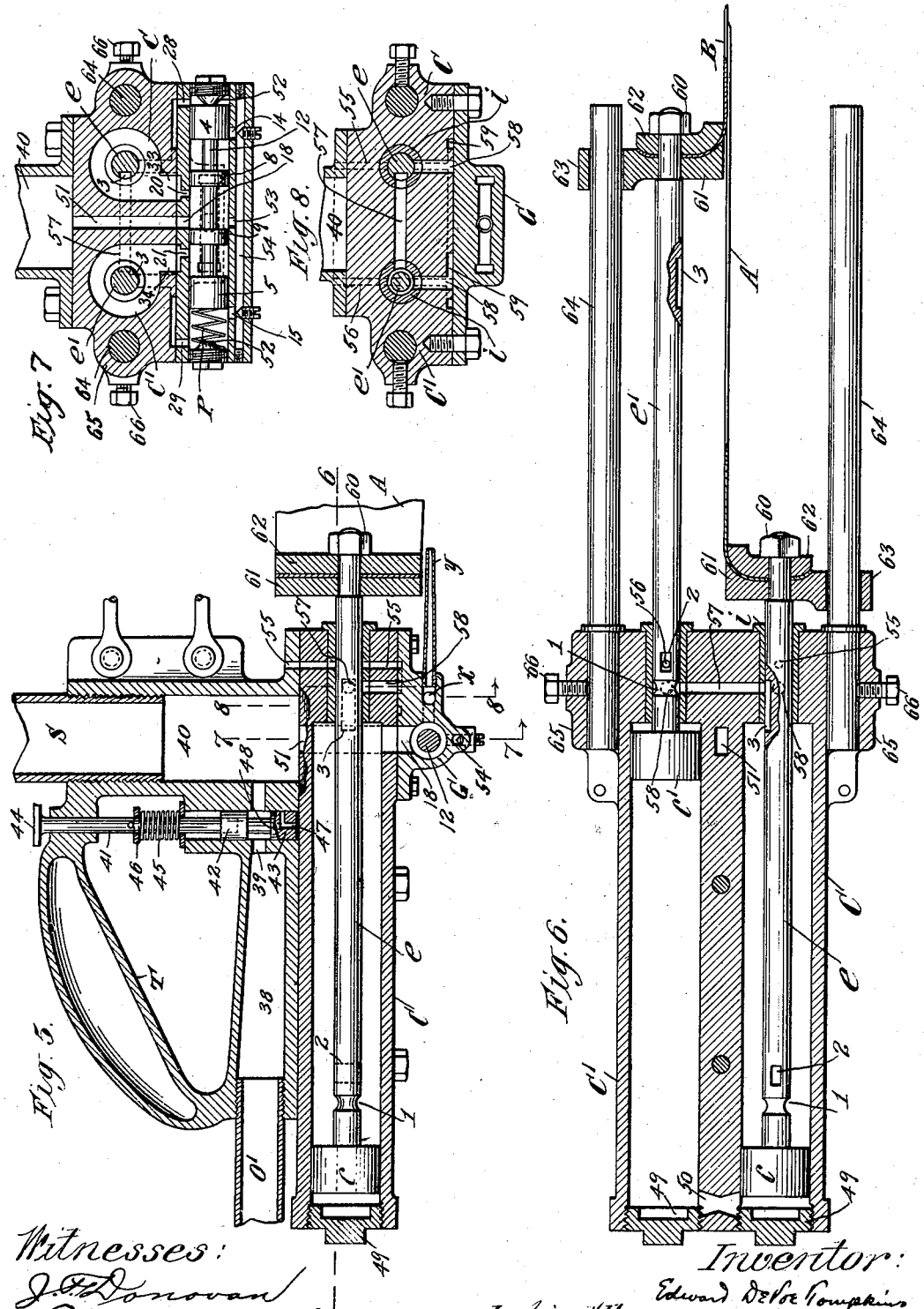

E. DE V. TOMPKINS.
SAWING APPARATUS.
APPLICATION FILED MAY 1, 1914.
1,215,431.
Patented Feb. 13, 1917.
3 SHEETS—SHEET 3.
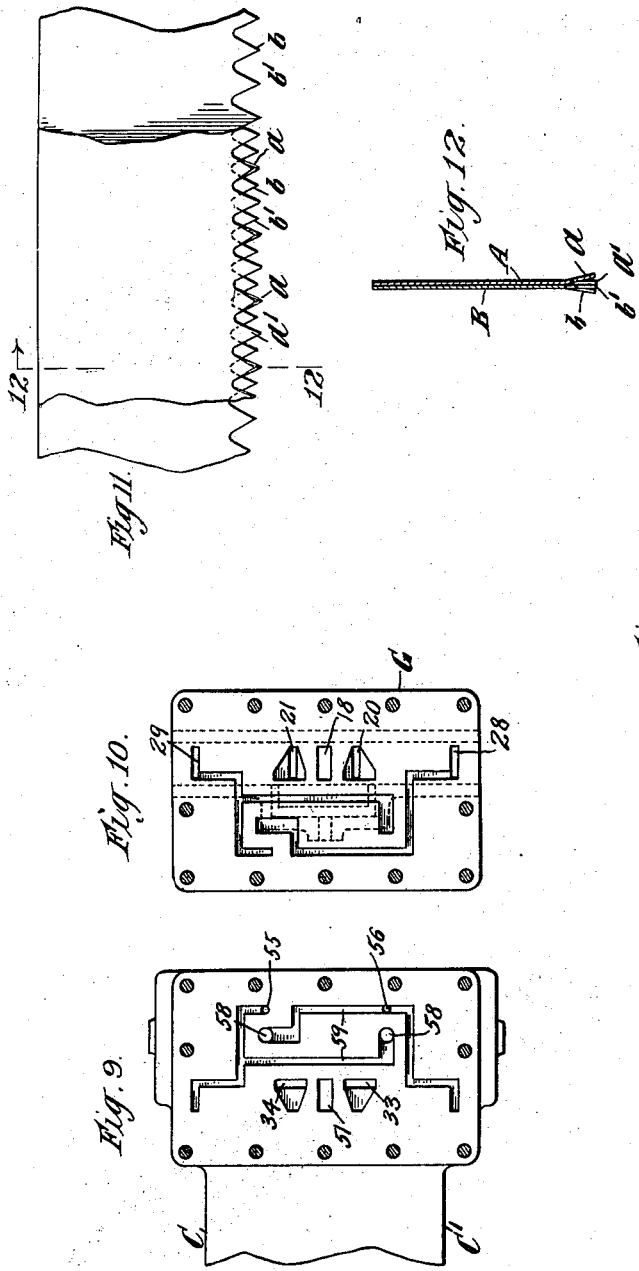
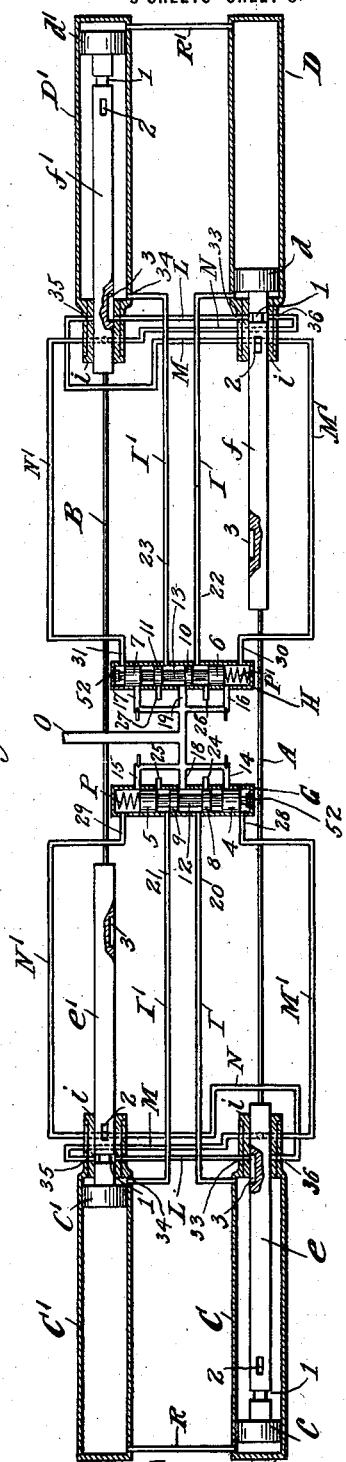
Witnesses:
J. F. Donovan
P. R. Tilden
Inventor:
Edward DeVoe Tompkins
By his Attys:
Philipp, Sawyer, Rice, Kennedy

UNITED STATES PATENT OFFICE.

EDWARD DE VOE TOMPKINS, OF NEW YORK, N. Y.

SAWING APPARATUS.

1,215,431.
Specification of Letters Patent.
Patented Feb. 13, 1917.

Application filed May 1, 1914. Serial No. 835,607.

*To all whom it may concern:*

Be it known that I, EDWARD DE VOE TOMPKINS, a citizen of the United States, residing at New York city, county of New York, and State of New York, have invented certain new and useful Improvements in Sawing Apparatus, fully described and represented in the following specification and the accompanying drawings, forming a part of the same.

This invention relates generally to saws, the particular object of the invention being the provision of a power-operated saw, so constructed as to be capable of performing all the functions of the ordinary circular saw, and at the same time possessing, in the form of the invention shown, the additional advantage of being portable and having its working parts in such an exceedingly compact form that it will find application in situations where a circular saw of ordinary construction could not possibly be used.

The invention will be found particularly useful in pier and dock work, particularly where it is desired to top off piles at low water level, it having previously been necessary to employ an ordinary two-man cross-cut saw, or buck-saw for this work, because of the impossibility of floating a barge containing a circular saw over the piles to be cut. By the employment of this invention, a great saving in time in carrying out the above described operation may be attained. The invention is also useful in felling trees, or in any other work where the ordinary cross-cut saw operated by two men must be used extensively.

In addition, the invention may be used for cutting only partly through timber,—for instance, in making tenons, joints, and the like, work equally impossible of accomplishment with the circular saw. While the utility of the invention will be felt more strongly when employed for cross-cutting timber, by the substitution of proper blades it may be used for ripping, *i. e.*, cutting with the grain, as well.

A full understanding of the invention will now be given by the following detailed description of a construction embodying the same, taken in connection with the accompanying drawings illustrating the invention in a preferred form, and the features thereof forming the invention pointed out in the claims.

In the drawings,—

Figure 1 is a side elevation, partly in section, of the improved saw;

Fig. 2 is a horizontal section taken on the line 2—2 of Fig. 1;

Fig. 3 is a view of the mechanism for operating the saw looking in the direction of the arrow 3 in Fig. 1;

Fig. 4 is an end elevation of the same looking in the direction of the arrow 4 in Fig. 1;

Fig. 5 is a vertical sectional view of one of the cylinders showing the pistons therein in elevation;

Fig. 6 is a horizontal sectional view taken on the line 6—6 of Fig. 5;

Fig. 7 is a section taken on the line 7—7 of Fig. 5 looking in the direction of the arrow;

Fig. 8 is a section taken on the line 8—8 of Fig. 5 looking in the direction of the arrow;

Fig. 9 is a plan view of the bottom of the forward end of the cylinder casing, showing the arrangement of the ports;

Fig. 10 is a top plan view of the valve casing, showing the ports corresponding to those in the cylinder casing;

Fig. 11 is a detail view of the saw blades;

Fig. 12 is a vertical cross section taken on the line 12—12 of Fig. 11, looking in the direction of the arrow; and Fig. 13 is a diagram illustrating the operation of the saw.

In the present embodiment of the invention, the saw is of the frame saw type and has a plurality of juxtaposed blades, in the present instance two, A, B, which are supported in the frame work and are adapted to be reciprocated simultaneously in opposite directions during the operation of the saw by the mechanism presently to be described. In order to prevent interference of the teeth of one blade with those of the other, and at the same time to give the necessary set or bend for cross-cutting, a number of the teeth $a$ of one blade (see Figs. 11, 12) are set oppositely to the set teeth $b$ of the other blade, while the remainder of the teeth $a'$, $b'$, are straight, that is, they lie in the same planes as the blades. In practice, the proportion of set to straight teeth may be regulated as will be found most efficient for the particular work in view. It will thus be seen that when the two blades which are designed to reciprocate in the same kerf or cut are put into operation, the same effect as that of a single-bladed crosscut saw of either the reciprocating or circular type will be obtained.

The saw-blades are arranged to be reciprocated in opposite directions alternately by suitable means. In the present example, there is provided a power mechanism arranged to be operated by fluid pressure; for example, compressed air. This power mechanism is illustrated in one specific embodiment of the invention, in Figs. 1 to 10 inclusive. Fig. 13 is a diagrammatic view intended to illustrate the principles of operation of this particular embodiment of the invention and such operation will first be described in connection with said Fig. 13. The saw-blades A, B, are shown as spaced considerably from each other, for the purpose of clear illustration. Of course, it is to be understood that these blades are to be side by side and run in the same saw kerf. Each blade is provided at each end with means for operating it. In the present example, the means for operating the saw-blades comprises twin cylinders at each end of the blades, these being indicated at C, C', D, D', each cylinder being provided with a piston indicated at c, c', d, d', having a piston rod e, e', f, f', to which the respective end of its corresponding blade is connected by any suitable means, as for example the mechanism hereinafter described. The respective pistons and cylinders each constitute a single-acting device arranged to pull the corresponding saw-blade in one direction only, so that the saw is operated by a tension or draft, rather than by a push, whereby buckling of the saw-blade is avoided. When the piston connected to one end of a saw-blade is operated by fluid pressure to pull the blade, the piston attached to the opposite end of said blade is thereby also pulled along. In the construction shown, each piston is arranged to control the supply of fluid pressure to its cylinder and this is most conveniently done by arranging the piston rod to perform the functions of a valve controlling mechanism. For this purpose, each piston rod in the present embodiment of the invention is provided with three passageways. One passage, indicated at 1 and conveniently formed by the reduction of the diameter of the piston rod serves as a transfer port, as will be more fully explained hereinafter, this transfer port being at the end of the piston rod toward the piston. Each piston rod is also provided with a diametrical slot indicated at 2, which serves at the proper time as an exhaust passage, as will be more fully explained hereinafter. Each piston rod is also provided with a cavity or recess 3 near its front end, this serving as an inlet passage or admission port at the proper time, as will be explained later. These various passages formed in the respective piston rods serve as means for controlling certain valve mechanism by which fluid under pressure is admitted to the respective cylinders.

The valve mechanism employed in the particular embodiment of the invention herein described comprises two piston valve devices most conveniently arranged transversely to the cylinders. Each piston valve device consists of a cylindrical valve casing indicated at G, H, in which is located a longitudinally movable piston valve, comprising two end pistons 4, 5, 6, 7, and two intermediate disk pistons 8, 9, 10, 11, suitably connected, as by a central rod 12, 13, whereby three annular spaces are formed, about the respective rods 12, 13, viz. a central one between the two disks 8 and 9, 10 and 11, respectively, and two outer spaces, one between each disk and its respective end piston, as for example between the disk 8 and the end piston 4. Each end piston is arranged to close or open a supply port connected to a source of fluid pressure, these supply ports being indicated at 14, 15, 16, 17, respectively. The source of fluid pressure is also connected to a central port in each valve casing, said ports being indicated at 18, 19, respectively, each port being always in communication with the respective intermediate annular space between the corresponding two disk pistons 8 and 9, 10 and 11. Each valve casing is also provided with two ports 20, 21, 22, 23, which are alternately put in communication with the respective central port 18, 19, or with an exhaust port in the valve casing leading to the outer air, these exhaust ports being indicated at 24, 25, 26, 27. In addition, each end of the valve casing is provided with a port 28, 29, 30, 31, arranged to supply fluid pressure behind the respective end pistons.

The piston rods e, e', f, f', pass through fluid-tight bushings i at the front ends of their respective cylinders, and these bushings are provided with ports controlled by the respective piston rods, as will be more fully explained hereinafter. The cylinders C, C', have their front ends connected with the ports 20, 21, respectively, of the corresponding valve device by any suitable conduits, as for example the pipes I, I', indicated in Fig. 13. One port indicated at 33 of the cylinder C is connected by a pipe L to a port 34 in the bushing of the cylinder C', said port 34 being arranged to be put in communication with a port 35 in said bushing through the annular space 1 of the piston rod e'; the said port 35 being connected by a suitable conduit, as for example the pipes M, M', to the port 28 in the valve casing G; the said pipe M also having a connection with a transverse hole or passage in the bushing i of the cylinder C, so that when the slot 2 of the piston e comes opposite said hole in the bushing, the pipes M, M', will be put in communication with the atmosphere. The bushing i of the cylinder C also has a port 36 connected by pipes N, N', with the port 29 in the valve casing G, the pipe N being connected to a hole or passage in the bushing i of the cylinder C', so that when the slot 2 of the piston rod e' comes in line with said hole, the pipes N, N', will be put in communication with the atmosphere. The other cylinders D, D', are also provided with bushings having ports arranged as described in connection with the cylinders C, C', and are connected in a similar manner with the corresponding ports of the valve casing H; the respective pipe connections illustrated in the diagram being marked with corresponding reference letters. The ports 14, 15, 16, 17, 18, 19, of the valve casings G, H, are connected by suitable conduits with each other and with a main fluid supply pipe O. Needle valves are provided in the conduits leading to the ports 14, 15, 16, 17, to throttle the fluid on its way to said ports, for a purpose more fully explained hereinafter. In order to maintain the piston valves in predetermined opposite positions, springs P, P', are placed in the valve casings G, H, at respectively opposite ends of the valves, as clearly shown in the drawings.

The outer ends of the cylinders C, C', are connected by an equalizing pipe R, and the corresponding ends of the cylinders D, D', are also connected by an equalizing pipe R'.

The operation of the device thus far described is as follows:

The diagram, Fig. 13, shows the pistons of the cylinders, C, D', as having just completed their respective outward or working strokes, while the corresponding piston valve devices have not yet been thrown to reverse such stroke. At this time, the fluid pressure from the pipe O is passing as follows; through the port 18, through the central annular chamber in the valve casing G, and thence through the port 20 to the inlet end of the cylinder C. The piston rod of this cylinder has reached a position where the port or recess 3 in said piston rod opens a communication from the interior of the cylinder C to the port 33 and pipe L. The piston rod e' of the cylinder C' has been brought with its transfer passage 1 in line with the ports 34, 35, while the outer end of the piston rod e of the cylinder C has closed off the branch passage from the pipe M' through the bushing i of said cylinder C. The pressure fluid therefore passes from the interior of the cylinder C, through the port 3 along the pipe L, through the ports 34, 35, and out through the pipes M, M', to the port 28 at one end of the valve casing G. On the other hand, the pipe N being closed at port 36 by the outer end of piston rod e the pipe N' is in communication with the atmosphere through the slot 2 in the piston rod e' of the cylinder C', thus opening the port 29 in the valve casing G to the atmosphere. The pressure through the port 28 forces the piston valve to make its stroke toward the opposite end of the valve casing, whereby the disk 8 is shifted to cut off the communication between the port 18 and the port 20, at the same time putting the port 20 in communication with the exhaust port 24 through the space between the disk 8 and the piston 4. At this time, also, the disk 9 has been moved so as to cut off communication between the port 21 and the exhaust port 25, while at the same time establishing communication between the port 18 and the port 21, whereby the pressure fluid from the main pipe O is admitted to the pipe I' and thence to the front end of the cylinder C'. On the opposite end of the apparatus, the piston rod f' of the cylinder D' has put the interior of its cylinder in communication with the port 31 of the valve casing H, while piston rod f has put the opposite end of said valve casing in communication with the atmosphere, so that the piston valve in the casing H will shift in a direction opposite to that in which the piston valve in the casing G was shifted, thereby cutting off the air supply to the cylinder D' and admitting it to the cylinder D. Thereupon, the pistons c', d, make their outward or working strokes, so that the saw B moves in one direction while the saw A moves in the opposite direction. As the piston d moves, for example, to the right in Fig. 13, pulling the saw A, it also pulls the piston c with it. As the piston c' in the cylinder C' moves to the left in Fig. 13, it pulls the saw B to the left and with it the piston d'. As soon as the piston c' has moved a short distance outward on its working stroke, the ports 34, 35, are cut out of communication and closed by the piston rod e', while the slot 2 in said piston rod is no longer in communication with the hole through the bushing i in the cylinder C' and, consequently, the pipes N, N', are cut off from communication with the atmosphere. The needle valves, which throttle the passage of fluid pressure to the ports 14, 15, 16, 17, are for the purpose of permitting a limited amount of air to enter behind the pistons 4, 5, 6, 7, respectively, thereby maintaining a slight amount of pressure behind the piston valves, and holding them in proper position until the chamber behind said pistons is put in communication with the atmosphere through the respective pipes or passages and slots 2 in the corresponding piston rods, whereupon this pressure is relieved slightly in advance of the time when the piston valve is thrown positively by the admission of the main supply to the opposite end of said piston valve, the movement of the piston valve closing the corresponding ports 14, 15, 16, 17 at the proper time. It will be seen that by this arrangement the saws are reciprocated simultaneously in opposite directions, this reciprocation being continued automatically so long as fluid pressure is supplied to the main conduit or inlet O.

In the particular embodiment of the invention illustrated in Figs. 1 to 10 inclusive, the cylinders C, C', D, D', are united in pairs in any suitable way, as for example by casting each pair of cylinders integral, and these pairs are connected with each other by a suitable saw-frame indicated at S, Fig. 1, this frame being tubular, for a reason hereinafter explained. Each end of the apparatus is provided with a handle, these handles being indicated at T, U, respectively. One end of the apparatus is provided with an inlet for fluid under pressure, which is indicated at O.

The handle T is provided with an inlet chamber 38 communicating at its outer end with the supply pipe O' and at its inner end with a duct 39 of considerably less diameter than the inlet chamber (see Fig. 5). This duct crosses the path of a valve chamber extending vertically in the casting of the handle member T and communicates with an inner chamber 40, from which pressure is supplied to the adjacent pair of cylinders C, C', and to the opposite pair of cylinders D, D', through the tubular frame S. The admission of air may be manually controlled by means of a throttle valve, which, in the type shown, consists of a stem 41 having separated disks 42, 43. The valve stem extends through an opening in the handle and is provided at its upper end with a push-button 44 to permit complete control of the operation of the saw by pressure of the thumb. A spring 45 bearing against a collar 46 secured to the valve stem maintains the valve in normally closed position. Any remaining pressure in the chamber 40 after the valve has been closed may be exhausted through a by-pass 47 in the valve disk 43, which communicates with a small port 48 (see Fig. 1) leading to the atmosphere.

Assuming that the throttle valve is open, compressed air passes from the supply pipe O' through the chamber 38 and duct 39 into the inner chamber 40. From there on, the air is divided into two currents, one passing through the frame S to the cylinders D, D', and the other directly to the pair of cylinders C, C'. The cylinder chambers are closed at the outer ends by means of heads 49 (see Fig. 6) provided on their inner surfaces with recesses, which retain a sufficient quantity of air to act as buffers and prevent the pistons from striking against the heads on their outer or power strokes. Connecting the two cylinders is a port 50 conveniently obtained by drilling diagonally from both sides of the openings before the heads are applied. This port permits pressure to pass back and forth from one cylinder to the other during the operation of the pistons and in this manner acts to relieve any undue pressure on the back of the pistons during the power stroke, as explained hereinbefore in connection with the pipes R, R', Fig. 13. Secured to the inner end of the pair of cylinders C, C', and directly beneath them is the valve casing G, Fig. 5, having a transverse valve chamber, into which air is admitted through a main inlet in the form of a vertically extending slot 51 in the connecting wall of the two cylinders opening at its upper end into the chamber 40, and at its lower end into the port 18 in the valve casing.

Admission of pressure to the cylinders C, C', which is effected through the ports 20, 21, alternately, is controlled by means of the pressure-operated piston valve in the valve casing G. The outer surfaces of the outer pistons 4, 5, are arranged to come into contact with the conical extremities of plugs 52, Fig. 7, so that sufficient space for the admission of pressure back of the heads is obtained. The disks 8, 9, as explained in connection with Fig. 13, are adapted to shut off the communication between the inlet port of the cylinder C' and the main inlet 18, when the valve is in the position shown in Fig. 7, and to permit air to enter the cylinder C through its inlet port during the power stroke of the piston c. Until the piston c has reached the limit of its stroke, the valve is maintained in this position by means of fluid pressure on the head 5, which is introduced in a small quantity in that portion of the chamber in the rear of the head 5 through a small port 53 opening into a chamber 54 below the valve chamber and thence through the corresponding port 15 and its needle valve. A similar port 14 with a needle valve is provided to admit air in small quantities in the rear of the head 4, when the position of the valve is reversed. In Figs. 6 and 13 the pistons are shown in a position just as the piston c is reaching the end of its power stroke and the piston c' is at the end of its return stroke, but prior to the reversal of the corresponding piston valve in casing G. When the piston valve is reversed, it closes the inlet 20 and opens the inlet 21, admitting pressure to the cylinder C'. Just before this takes place, it is necessary to exhaust the pressure in that portion of the valve chamber to the rear of the head 5 and to admit pressure to the rear of the head 4.

As before explained in connection with Fig. 13, the piston rods e, e' of each piston c, c', are provided with vertically extending slots 2, these being so situated relatively to the head ends of the pistons as to communicate with valve exhaust ports 55, 56 (drilled through the cylinder casing and piston rod bushings *i*), when the pistons have almost reached the limit of their return strokes. These ports are continued upwardly through the handle casting to the atmosphere and downwardly into communication with the ports 28, 29, leading respectively to the portions of the valve chamber to the rear of the valve heads 4, 5. As shown in Fig. 6, the slot 2 in the piston rod *e'* is in communication with the port 56 and, through it, with the port 59, thereby opening the chamber in the rear of the head 5 to the atmosphere and relieving the pressure therein. Until the pistons have reached the stage in the cycle of operation shown, the continuations of the valve-exhaust ports to the atmosphere are dead-ended by the piston rods *e*, *e'*, so that air is not allowed to escape excepting at the desired time.

The pressure used for throwing the valve to the position opposite that indicated in Fig. 7 is obtained from the exhaust from the cylinder C, through the passage 3 in the piston rod *e*, and the passage 57 (which corresponds to the pipe L, Fig. 13), through the transfer passage 1 in the piston rod *e'*, thence through passages 58, 59, Fig. 8, corresponding to the pipes M, M', Fig. 13, to the port 28 behind the piston 4.

In the complete embodiment of the best form of the invention illustrated in Figs. 1 to 10, the exhaust ports from the valve mechanisms, which are indicated in dotted lines, in Fig. 7, are arranged to discharge into a common exhaust chamber *x*, Fig. 5, provided with a nozzle outlet *y*, Fig. 5, arranged to discharge along the line of the saw blades. It will be understood that there is a nozzle of this kind at each end of the apparatus, so that the exhaust from the valve mechanisms serves to blow the sawdust away from the saw-blades.

The saw-blades A, B, may be attached to the respective pistons in any suitable manner, but for the purpose of making a satisfactory connection of each blade with its respective piston, while at the same time permitting the blades to reciprocate in opposite directions, side by side, each blade may be connected to its respective pistons in the following manner:

The end of the piston rod for a short distance is provided with a reduced portion, on which is secured, by means of a suitable nut 60 a pair of coöperating crosshead members 61, 62, one (61) of which is provided with a concave surface, into which fits the convex surface of the other member 62. An extension 63 of the crosshead is provided with a laterally-extending opening, through which passes a guide-rod 64 secured in a bracket 65 integral with the cylinder casing. A set-screw 66 engaging the rod 64 serves to hold the rod, which is also provided with a collar in contact with the transverse wall of the cylinder casing. Each end of the saw-blade is provided with an opening, through which is passed the reduced portion of the corresponding piston rod, the end of the blade being placed between the two members 61, 62. When the nut 60 is tightened, the end of the blade will be bent in the manner clearly shown in Fig. 6, so that an exceedingly secure and strong fastening is obtained. As will be clear from Fig. 6, the adjacent ends of the two blades are bent in opposite directions away from each other, thereby permitting their inner surfaces to lie in juxtaposition, so that the two blades may work in the same kerf.

While the frame S might be made rigid enough to prevent distortion and the disadvantageous effects of vibration, such a construction would necessitate a relatively heavy frame. Therefore, for the purpose of avoiding unnecessary weight and at the same time providing a frame which will be satisfactory, the frame S is formed of resilient material and has its lower ends connected by a straining device. In order that this straining device may be as light as possible, and at the same time effective in its action, it is kept close to the extreme ends of the frame S. To accomplish this result, however, it is necessary to so construct the straining member that it will not interfere with the passage of the saws through the timber. Therefore, this straining member, in the best embodiment of the invention, consists of a flat tie-plate 67, whose thickness is no greater than the thickness of the two saw-blades, and preferably is less than that, so that the tie-plate may follow the saw-blades into the kerf of the timber. This tie-plate 67 is connected at each end to the respective ends of the saw-frame S, in any suitable manner, but most advantageously by providing turnbuckles 68, at each end, which are connected to the socket portions of the castings into which the ends of the frame S are screwed. Further, the tie-plate 67 is given a predetermined tension, by means of the turnbuckles, in excess of any strain which the saw-blades will encounter. In practice, it has been found that the tension on the tie-plate may conveniently be about 300 pounds.

It will be seen that, with a device such as described, two men may conveniently handle the saw and, as the blades reciprocate in opposite directions, any strain encountered by either blade and tending to pull the frame S in a given direction will be counter-balanced by the strain encountered by the other blade tending to move the frame in the opposite direction. Therefore, none of the reactions due to the sawing operation will be transmitted to the operatives. The saw may be used in any desired position, it being assumed that the fluid pressure employed as a source of power will be supplied to the pipe O' by flexible means, for example a hose, not shown, so that the saw may be turned in any desired direction.

Furthermore, the construction is such that the apparatus is particularly suitable for sub-aqueous work, such as sawing off piles below the water level, and the like. It is obvious that the apparatus may be suspended, in a suitable way, and, if used at considerable depths, may be controlled by divers, air under pressure being supplied to the apparatus, by a suitable hose. The D-shaped frame is a very convenient means for transmitting fluid pressure from one end of the apparatus to the other end, thereby avoiding the necessity of auxiliary pipe connections.

What is claimed is:—

1. In a device of the character described, the combination, with a pair of saw blades arranged to work in the same kerf, of means for drawing each blade alternately in opposite directions, the means for drawing one blade being arranged to operate simultaneously with but in opposite direction to the corresponding means for drawing the other blade.

2. In a device of the character described, the combination, with a pair of saw blades arranged to work in the same kerf, each blade having teeth set oppositely to those of the other blade, of means for drawing each blade alternately in opposite directions, the means for drawing one blade being arranged to operate simultaneously with but in opposite direction to the corresponding means for drawing the other blade.

3. In a machine of the character described, the combination, with a plurality of saw blades arranged to work side by side in the same kerf, of means attached to each end of each blade, each means being arranged to draw its blade in one direction, and connections whereby the means of one blade operate in alternation with each other and simultaneously with but in opposite direction to the corresponding means of the other blade.

4. In a portable sawing device, the combination, with a pair of saw blades arranged to work side by side in the same kerf, of a plurality of pistons, one for each end of each saw blade and connected thereto, and means for supplying fluid pressure alternately to the respective pistons of one blade in a direction to force each of said pistons outward, whereby the respective blade is pulled alternately in each direction, and means for supplying fluid pressure alternately to the pistons of the other blade in a direction to force each of said pistons outward, the means for supplying fluid pressure to the pistons of one blade acting in a direction opposite to that of the means for supplying fluid pressure to the other blade, whereby the blades are pulled in alternately opposite directions relative to each other.

5. The combination of a plurality of reciprocating cutting blades adapted to work in the same kerf, and pressure-operated mechanism for imparting simultaneously drag motion to each of said blades in opposite directions.

6. The combination of a plurality of cutting devices adapted to work in the same kerf, pistons attached to each end of said devices, and means for permitting fluid-pressure to act on said pistons in such manner that reciprocatory drag motion is imparted simultaneously in opposite directions to said devices.

7. The combination of a pair of cutting devices adapted to work in the same kerf, pistons attached to the ends of said devices, and valve mechanism for permitting fluid pressure to act on the pistons at one end of one cutting device and on the pistons at the opposite end of the other cutting device in such manner that reciprocatory drag motion is imparted simultaneously in opposite directions to said devices.

8. The combination of a pair of cutting devices adapted to work in the same kerf, pistons attached to each end of said devices, cylinders for said pistons, valve mechanism for permitting fluid pressure to act on the piston at one end of one cutting device and on the piston at the opposite end of the other cutting device in such manner that reciprocatory drag motion is imparted simultaneously in opposite directions to said devices, and a single exhaust conduit arranged to receive the exhaust from both cylinders and discharge it along the cutting edges of the cutting devices.

9. The combination, with a pair of cutting blades arranged to reciprocate simultaneously in opposite directions in the same kerf, of single acting pressure operated mechanism at each end of each blade for drawing each blade alternately in opposite directions and simultaneously in a direction opposite to that in which the other blade is drawn, and a pressure operated valve device arranged to control the supply of pressure to the respective single acting pressure operated mechanism.

10. The combination, with a pair of cutting blades arranged to reciprocate simultaneously in opposite directions in the same kerf, of single acting pressure operated mechanism at each end of each blade for drawing each blade alternately in opposite directions and simultaneously in a direction opposite to that in which the other blade is drawn, a pressure operated valve device arranged to control the supply of pressure to the respective single acting pressure operated mechanism, and means for preventing the valve from throwing before the end of a stroke.

11. The combination of a plurality of cutting blades, cylinders at the ends of the blades, a piston working in each cylinder, the ends of the pistons being attached to the opposite extremities of the blades, and means for permitting fluid pressure to act alternately on each piston in such manner that reciprocatory drag motion is imparted simultaneously in opposite directions to said blades.

12. The combination of a pair of cutting blades, cylinders at the ends of the blades, pistons working in each cylinder, the ends of the pistons being attached to the opposite extremities of the blades, a manually-controlled valve for permitting the introduction of fluid pressure to alternate cylinders, and valve mechanism operated by the exhaust from the other cylinders for causing a reversal of the application of power to the blades at the end of the power stroke.

13. In a sawing apparatus, the combination, with a frame, a pair of saw-blades arranged in juxtaposition, and means carried by the frame for reciprocating the blades in alternately opposite directions, of a tie-member connected to the frame and having a predetermined tension in excess of the maximum strain to be encountered by the saw-blades.

14. In a sawing apparatus, the combination, with a frame, a pair of saw-blades arranged in juxtaposition, and means carried by the frame for reciprocating the blades in alternately opposite directions, of a tie-member connected to the frame back of the saws and arranged to follow the saw-blades into their common kerf.

15. In a sawing apparatus, the combination, with oppositely-arranged fluid-operated driving devices, and means for supplying fluid under pressure direct to one driving device, of a D frame, to the ends of which said driving devices are connected, said D frame being arranged to transmit fluid to the other driving device, and saws mounted between the ends of the D frame.

16. In a sawing apparatus, the combination, with oppositely-arranged fluid-operated driving devices, of a tubular frame connected to said driving devices and arranged to hold them in proper relation to each other, said tubular frame serving as a conduit for fluid pressure to one of the driving devices and a saw having its opposite ends connected to the respective fluid-operated driving devices and arranged to reciprocate between the ends of said tubular frame.

In testimony whereof, I have hereunto set my hand, in the presence of two subscribing witnesses.

EDWARD DE VOE TOMPKINS.

Witnesses:
P. B. PHILIPP,
P. F. KEHOE.